United States Patent
Teller

(10) Patent No.: US 9,716,878 B2
(45) Date of Patent: Jul. 25, 2017

(54) VOLUMETRIC DISPLAY USING ACOUSTIC PRESSURE WAVES

(71) Applicant: X Development LLC, Mountain View, CA (US)

(72) Inventor: Eric Teller, Palo Alto, CA (US)

(73) Assignee: X Development LLC, Mountain View, CA (US)

(*) Notice: Subject to any disclaimer, the term of this patent is extended or adjusted under 35 U.S.C. 154(b) by 8 days.

(21) Appl. No.: 14/968,162

(22) Filed: Dec. 14, 2015

(65) Prior Publication Data

US 2017/0171536 A1  Jun. 15, 2017

(51) Int. Cl.
*H04N 13/04* (2006.01)

(52) U.S. Cl.
CPC ..... *H04N 13/0493* (2013.01); *H04N 13/0497* (2013.01)

(58) Field of Classification Search
CPC ............. H04N 13/0493; H04N 13/0497
See application file for complete search history.

(56) References Cited

U.S. PATENT DOCUMENTS

| | | | |
|---|---|---|---|
| 6,766,691 B2 | 7/2004 | Venturelli et al. | |
| 8,289,274 B2 | 10/2012 | Sliwa et al. | |
| 9,223,192 B1* | 12/2015 | Linnell | G03B 21/608 |
| 2010/0321478 A1* | 12/2010 | Sliwa | G02B 27/2271 |
| | | | 348/51 |
| 2014/0327747 A1 | 11/2014 | Kong | |
| 2015/0042678 A1 | 2/2015 | Alt et al. | |
| 2015/0309494 A1 | 10/2015 | Kobayashi et al. | |

FOREIGN PATENT DOCUMENTS

| | | |
|---|---|---|
| KR | 10-2014-0090401 A | 7/2014 |
| WO | WO 2014/165863 A2 | 10/2014 |

OTHER PUBLICATIONS

Marzo et al., A. 'Holographic Acoustic Elements for Manipulation of Levitated Objects', In: Nature Communications 6, Oct. 27, 2015, Article 8661, 7 pages. (http://www.nature.com/ncomms/2015/151027/ncomms9661/full/ncomms9661.html).

(Continued)

*Primary Examiner* — Charles Hicks
(74) *Attorney, Agent, or Firm* — Christensen O'Connor Johnson Kindness PLLC

(57) ABSTRACT

A volumetric display system includes a volumetric display stage, a plurality of acoustical actuators, and a control system. A plurality of voxel particles are re-arrangeable within the volumetric display stage via acoustic pressure waves to assume controllable positions in three-dimensional ("3D") space to collectively assume a unified 3D shape. The plurality of acoustical actuators are disposed about the volumetric display stage to emit the acoustic pressure waves and establish a 3D sound field pattern within the volumetric display stage for physically manipulating the voxel particles. A control system is coupled to the acoustical actuators to manipulate the 3D sound field pattern. The control system includes a volumetric image module configured to receive 3D image data describing the unified 3D shape and compute the 3D sound field pattern for arranging the voxel particles into the unified 3D shape.

24 Claims, 4 Drawing Sheets

(56) References Cited

OTHER PUBLICATIONS

Ochiai et al., Y. 'Pixie Dust: Graphics Generated by Levitated and Animated Objects in Computational Acoustic-Potential Field', May 22, 2014. (http://www.researchgate.net/profile/Yoichi_Ochiai/publication/266659500_Pixie_dust_graphics_generated_by_levitated_and_animated_objects_in_computational_acoustic-potential_field/links/550c1a440cf2528164db3562.pdf).
Ghose, T. 'Sonic 'Tractor Beam' Can Levitate, Manipulate Objects', Oct. 28, 2015. (http://www.csmonitor.com/Science/2015/1028/Sonic-tractor-beam-can-levitate-manipulate-objects).
PCT/US2016/061160—International Search Report and Written Opinion, mailed Jan. 10, 2017, 9 pages.

* cited by examiner

VOLUMETRIC DISPLAY USING ACOUSTIC
PRESSURE WAVES

TECHNICAL FIELD

This disclosure relates generally to volumetric displays.

BACKGROUND INFORMATION

A volumetric display is a display device that generates a visual representation of a person, place, or object in three-dimensional ("3D") space. This is in contrast to traditional two-dimensional ("2D") display panels that generate images on a 2D plane, but provide a perception of depth using visual effects such as motion parallax, perspective, interposition, defocus blur, etc. While 2D display panels use "pixels" to reference each 2D picture element within the 2D image, a volumetric display uses "voxels," to reference each 3D picture element within the 3D representation. A voxel is a discrete volume having a well-defined coordinate in physical space. The coordinate space may be represented using Cartesian coordinates (e.g., x, y, z), polar coordinates (e.g., r, $\phi$, $\theta$), or otherwise. Volumetric displays generate 3D images via the emission, scattering, or relaying of illumination from the 3D coordinate space.

While 3D displays have long since been postulated in science fiction, volumetric displays are being realized today. One class of conventional volumetric displays is a Swept-volume display, which rapidly displays a series of slices of a 3D object and relies on the slow response time of human vision to blend the individual slices into a complete image, akin to a 3D raster scan. Another class of conventional volumetric displays is a static volume display, which uses an addressable volume of voxels that are transparent in an off state, but luminous in an activated state.

Volumetric displays have numerous practical and leisure applications that can leverage their 3D nature to provide benefits over 2D displays. There is certain to be new found practical and leisure applications as the technology evolves. Volumetric displays are likely to have broader adoption with time.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of operation of a volumetric display system that acoustically manipulates voxel particles in three-dimensional ("3D") space to assume 3D shapes are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
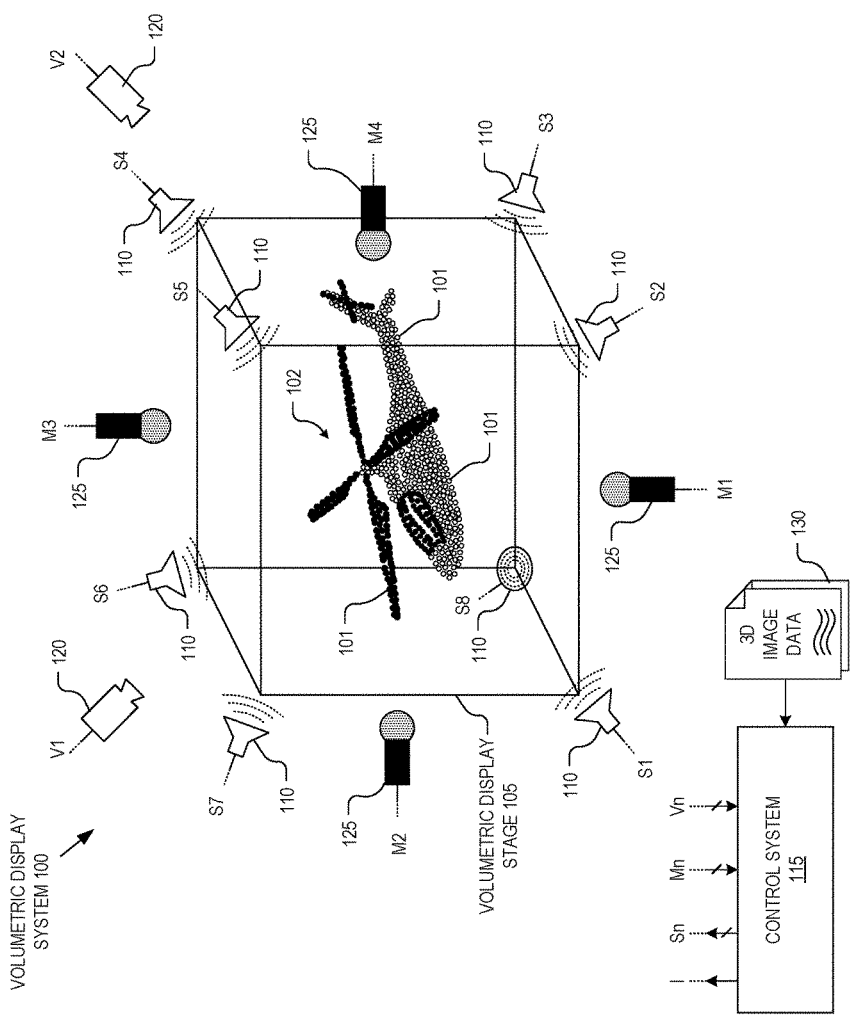
FIG. 1 is an illustration of a volumetric display system that acoustically manipulates voxel particles in three-dimensional ("3D") space to assume unified 3D shapes, in accordance with an embodiment of the disclosure.

FIG. 1 is an illustration of a volumetric display system 100 that acoustically manipulates voxel particles 101 in 3D space to collectively assume unified 3D shapes, in accordance with an embodiment of the disclosure. The illustrated embodiment of volumetric display system 100 includes a volumetric display stage 105, a plurality of acoustical actuators 110, a control system 115, feedback sensors, and a voxel particle injector (see FIGS. 4A & 4B for examples). The illustrated embodiment of feedback sensors includes image sensors 120 and acoustic sensors 125.

Volumetric display system 100 operates to arrange voxel particles 101 into a unified 3D shape 102 via acoustic pressure waves. Control system 115 receives 3D image data 130, which describes unified 3D shape 102. Based upon 3D image data 130, control system 115 computes a 3D sound field pattern for physically manipulating (e.g., acoustical levitation) voxel particles 101 in 3D space to collectively assume unified 3D shape 102. Control system 115 then drives acoustical actuators 110 to establish the 3D sound field pattern within volumetric display stage 105 to cause voxel particles 101 to assume controllable positions in the 3D space defined by volumetric display stage 105.

In one embodiment, the 3D sound field pattern is a standing wave pattern of pressure waves established in three dimensions within volumetric display stage 105 by acoustical actuators 110. Constructive and destructive interference between the pressure waves creates localized high and low pressure zones (i.e., high potential energy and low potential energy zones) throughout volumetric display stage 105. If driven to output sufficient acoustic energy, the voxel particles 101 are physically moved to, or otherwise held within, the low pressure zones established by constructive and destructive interference between the acoustic pressure waves. In other words, voxel particles 101 can achieve a stable or pseudo-stable position within a low potential energy or low pressure zone. Careful computation of the standing wave patterns in three dimensions can be used to organize the low pressure zones in 3D shapes based upon 3D image data 130. The 3D standing wave patterns can be computed and generated as a Fourier series—a decomposition of a series of simpler periodic signals (e.g., sines and cosines) that sum together to form the 3D standing wave pattern. Acoustical actuators 110 are driven with these constituent periodic signals to establish the desired interference pattern of high and low pressure zones throughout volumetric display stage 105. In this manner voxel particles 101 are controllably manipulated to collectively assume a unified 3D shape 102. In one embodiment, the 3D sound field pattern can be slowly adjusted to reposition voxel particles 101 while levitating and collectively morph voxel particles 101 from an initial unified 3D shape 102 (e.g., a helicopter) into a subsequent unified 3D shape 102 (e.g., an airplane).

Volumetric display stage 105 defines a 3D volume in which voxel particles 101 can be acoustically levitated or otherwise manipulated in 3D space. Volumetric display stage 105 can entirely surround or only partially surround this 3D volume. The 3D volume is the portion of 3D space in which standing waves are established in three orthogonal dimensions to physically manipulate voxel particles 101 into unified 3D shape 102. In other words, it is the spaced defined between the acoustical actuators 110 within which 3D shapes 102 can be formed. In one embodiment, volumetric display stage 105 is a see-through enclosure that isolates the voxel particles 101 from external influences (e.g., external air disturbances). In other embodiments, volumetric display stage 105 may include structural members that mechanically support acoustical actuators 110 and the various feedback sensors (e.g., image sensors 120 and acoustic sensors 125), but is otherwise open to the air of the external environment. In an enclosed embodiment, the interior volume may be air under atmospheric pressure, pressurized air, or other denser gases (e.g., inert gases) or even liquids. Denser gases or liquids can add viscosity and buoyancy, which can facilitate stability and levitation of voxel particles 101. However, increased viscosity will decrease the rate at which voxel particles 101 can be morphed from one unified image 102 into the next. In one embodiment, volumetric display stage 105 includes sound absorbing materials disposed around the structural members of volumetric display stage 105 to reduce their influence on the 3D sound field pattern. In one embodiment, the presence of these structural members is sonically analyzed and their influence/interference is accounted for when computing the 3D sound field pattern for a given unified 3D shape 102. In one embodiment, a calibration procedure can be executed to sonically inspect the reflection characteristics of volumetric display stage 105.

Voxel particles 101 may be formed from a variety of different sizes, colors, materials, and shapes. The material and structural selection of voxel particles 101 can influence their buoyancy, while their size and shape can affect their Reynolds number and thereby affect their response characteristic to pressure waves from acoustical energy. Near-neutral buoyancy materials/structures can reduce the acoustical energy needed to levitate or otherwise hold a voxel particle in a given position. Furthermore, voxel particles 101 having a more aerodynamic shape will introduce less sonic perturbations into the 3D sound field pattern thereby reducing the computing complexity. Example shapes for voxel particles 101 include spherical or elliptical particles, though other shapes may be used. Voxel particles 101 may include splines, scallops, scales, or surface grains that encourage axial rotations to develop angular momentum along with a resultant angular inertia for increased stability. Surface structures may also be designed to adjust the buoyancy and/or Reynolds number of voxel particles 101. Example materials for voxel particles 101 include low density plastic, foam (e.g., open cell foam), aerogel, or other low weight materials. Example structures include solid or hallow structures. In one embodiment, hallow spheres filled with a low density gas (e.g., helium, hydrogen) or a vacuum may be used to increase buoyancy.

In one embodiment, voxel particles 101 are multi-colored (e.g., red, green blue, white, black). By controlling which color of voxel particle 101 is suspended in a particular voxel location can yield a multi-color unified 3D shape 102. A color 3D display can be achieve via selective injection in a controlled manner of voxel particles 101 with designated colors into volumetric display stage 105. Once injected, visual tracking using image sensors 120 along with real-time feedback control over the acoustical levitation can be used to ensure that each color voxel particle retains its appropriate location. In yet another embodiment, voxel particles 101 are coated or impregnated with phosphorescent paint/particles. These phosphorescent voxel particles 101 can be selectively organized via phosphorescent color and illuminated with ultraviolet light to provide a multi-color 3D display.

Acoustical actuators 110 may be implemented using a variety of electroacoustic transducer technologies capable of generating sound waves of varying frequencies with phase control. For example, acoustical actuators 110 may be implemented using voice-coil speakers, cone tweeters, dome tweeters, piezo-tweeters, ribbon-tweeters, planar-magnetic tweeters, electrostatic tweeters, air motion transformers, horn tweeters, plasma tweeters, various woofers/subwoofers, or otherwise. Acoustical actuators 110 may each include a single acoustical actuator or an array of similarly sized or variably sized speakers to simultaneously generate different frequencies and/or phases as may be necessary by the constituent standing waves of a Fourier series. In the illustrated embodiment, acoustical actuators 110 are disposed proximate to the eight corners of a rectangular shaped volumetric display stage 105. However, in other embodiments, more or less acoustical actuators 110 may be used, having the same or different orientations. For example, arrays of acoustical actuators 110 may be disposed along two or more sides of volumetric display stage 105 for establishing standing ways along the three orthogonal dimensions.

The illustrated embodiment of volumetric display system 100 includes feedback sensors disposed about volumetric display stage 105 to sense positon of voxel particles 101 in real-time and provide real-time feedback signals to control system 115 indicative of the positon of voxel particles 101. The feedback sensors include one or more of image sensors 120 and/or acoustic sensor 125. The real-time tracking functionality provided by the feedback sensors can be used to ease the computational complexity associated with generating the 3D sound field pattern and accounting for interference or perturbations caused by the voxel particles 101 themselves. In particular, the real-time feedback tracking enables control system 115 to monitor responses to its acoustical inputs and make feedback adjustments, if necessary. Not only can visual tracking of voxel particles 101 be used, but acoustical tracking can be used as well. For example, acoustic sensors 125 can be used to record the audible output of acoustical actuators 110 while driving a particular 3D sound field pattern for arranging voxel particles 101 in unified 3D shape 102. If the sound recording deviates from what is expected based upon the input to acoustical actuators 110, then this difference is deemed to be due to interference/perturbations caused by voxel particles 101 themselves. In this scenario, the real-time sound recordings can be analyzed using a Fourier Transform (e.g., real-time computation of Fast Fourier Transforms) to compute and determine real-time corrections to the output of acoustical actuators 110.

Figure 2:
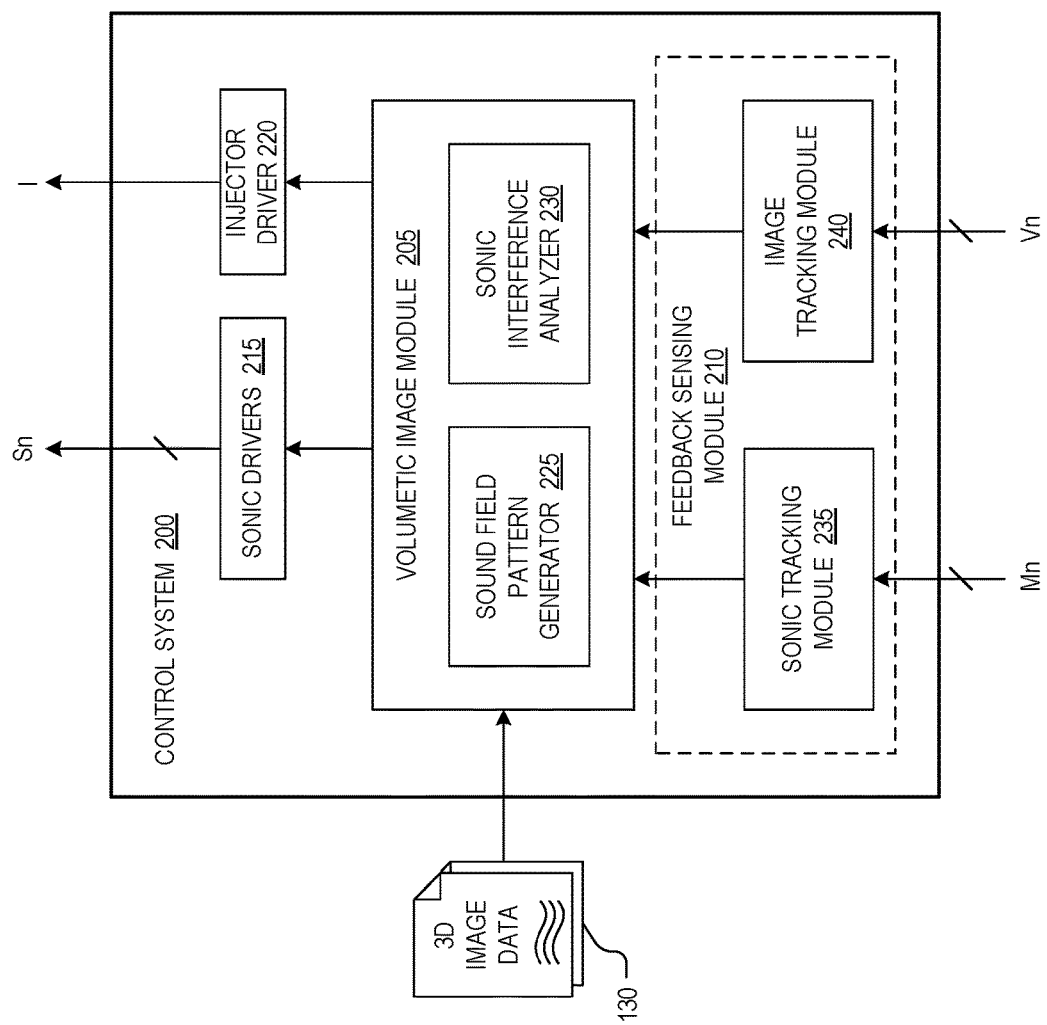
FIG. 2 is a functional block diagram illustrating a control system for a volumetric display system, in accordance with an embodiment of the disclosure.

FIG. 2 is a functional block diagram illustrating a control system 200 for volumetric display system 100, in accordance with an embodiment of the disclosure. Control system 200 is one possible implementation of control system 115 illustrated in FIG. 1. The illustrated embodiment of control system 200 includes a volumetric image module 205, a feedback sensing module 210, sonic drivers 215, and an injector driver 220. The illustrated embodiment of volumetric image module 205 includes a sound field pattern generator 225 and a sonic interference analyzer 230. The illustrated embodiment of feedback sensing module 210 includes a sonic tracking module 235 and an image tracking module 240. Although the feedback sensing module 210 illustrated in FIG. 2 includes both a sonic tracking module 235 and an image tracking module 240, in other embodiments, feedback sensing module 210 may be implemented with only one of the two feedback tracking modalities.

Control system 200 may be implemented as a combination of hardware, software, and firmware. For examples, the functional blocks of control system 200 may be implemented as software instructions executing on one or more central processing units. In some embodiments, a portion of the functional units may be implemented as hardware logic (e.g., application specific integrated circuit) to achieve reduced latency. In yet other embodiments, control system 200 is a hybrid system of hardware and software logic. The operation of control system 200 is described in connection with FIG. 3 below.

Figure 3:
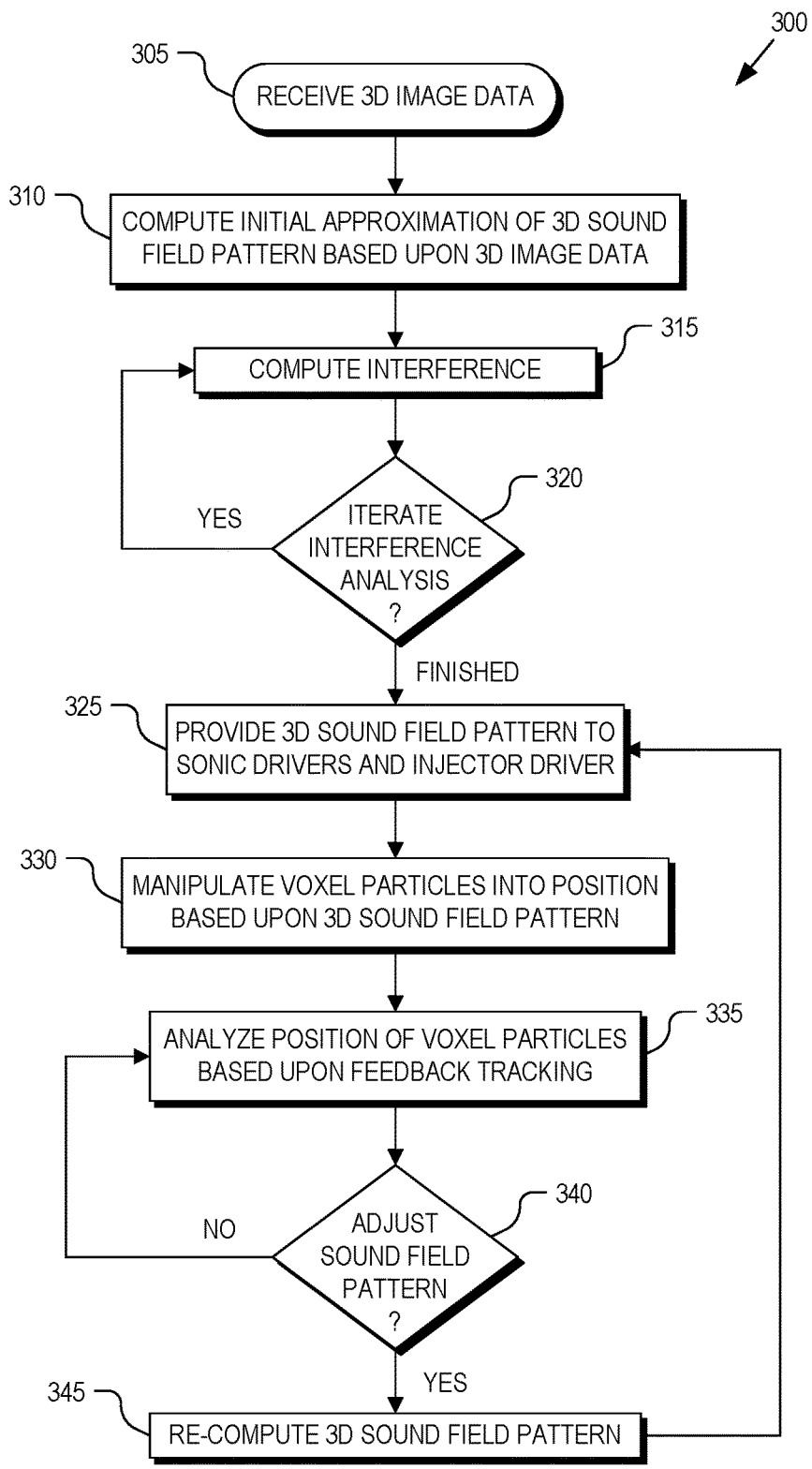
FIG. 3 is a flow chart illustrating a process of operation of a volumetric display system, in accordance with an embodiment of the disclosure.

FIG. 3 is a flow chart illustrating a process 300 of operation of a volumetric display system, in accordance with an embodiment of the disclosure. Process 300 is described with reference to control system 200 illustrated in FIG. 2. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, control system 200 receives 3D image data 130. 3D image data 130 is a data file(s) that describes a shape in 3D (e.g., unified 3D shape 102). In one embodiment, 3D image data 130 may be a computer aided design file describing an object in 3D. In other embodiments, 3D image data 130 may not only describe a 3D shape, but may also describe motion of the 3D shape (e.g., 3D video frames).

In a process block 310, volumetric image module 205 analyzes 3D image data 130 to generate a 3D sound field pattern for arranging voxel particles 101 in 3D space to assume the same shape as defined by 3D image data 130. In particular, sound field pattern generate 225 computes an initial approximation of the 3D sound field pattern. In one embodiment, sound field pattern generator 225 computes an initial approximation of 3D sound field pattern that uses constructive and destructive interference between standing pressure wave vectors (e.g., direction, frequency, and amplitude) to establish a localized low potential energy zone at the location of each image voxel as defined by 3D image data 130. In one embodiment, the initial approximation computed by sound field pattern generator 225 does not take into account interference or perturbations caused by voxel particles 101 themselves. Rather, the initial approximation assumes an ideal condition where the voxel particles 101 are transparent to sound waves used to generate the 3D sound field pattern.

In a process block 315, volumetric image module 205 refines the initial approximation using sonic interference analyzer 230. In one embodiment, sonic interference analyzer 230 contains sound models describing how voxel particles 102 reflect or otherwise interact with sound waves of various frequencies and trajectories. Using these sound models, sonic interference analyzer 230 sonically introduces voxel particles 101 into the initial approximation of the 3D sound field pattern to refine the pattern and generate a more accurate approximation of the 3D sound field pattern. The interference refinements performed by sonic interference analyzer 230 can be performed in an iterative manner (decision block 320) until the approximation converges on a final 3D sound field pattern within acceptable margins of error. Generation of mathematical models and iterative refinement of such models are known computational techniques.

Once the 3D sound field pattern has been generated with sufficient accuracy (decision block 320), process 300 continues to a process block 325. In process block 325, the refined 3D sound field pattern is provided to sonic drivers 215 and injector driver 220. Sonic drivers 215 use the determined 3D sound field pattern to drive acoustic actuators 110 in a manner that establishes the standing wave patterns defined by the 3D sound field pattern within volumetric display stage 105. In one embodiment, the 3D sound field pattern defines each constituent periodic signal of a Fourier series that are summed together in 3D to establish the 3D sound field pattern within volumetric display stage 105. In one embodiment, sonic drivers 215 use knowledge of the relative positions of acoustical actuators 110 and their attributes to drive acoustical actuators 110 as required to move or hold voxel particles 101 in position (process block 330).

Additionally, in the illustrated embodiment, the 3D sound field pattern is provided to injector driver 220 to facilitate initial injection of voxel particles 101 into volumetric display stage 105. In various embodiments, voxel particles 101 may be injected as a group, where they either drop or raise into their respective final positions, and held there via a localized low energy (low pressure) zone established according to the 3D sound field pattern. In other embodiments, they may be injected one at a time or a few at a time in a sequential manner while unified 3D shape 102 is built incrementally.

Figure 4A:
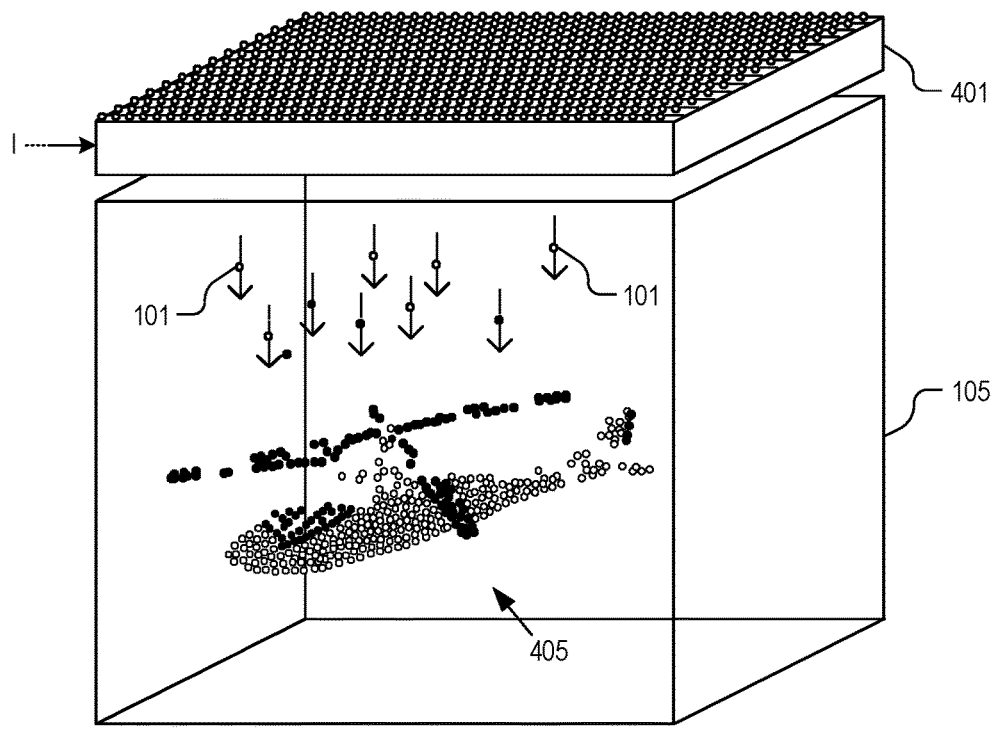
FIG. 4A illustrates a drop pan implementation of a voxel particle injector for a volumetric display system, in accordance with an embodiment of the disclosure.
Figure 4B:
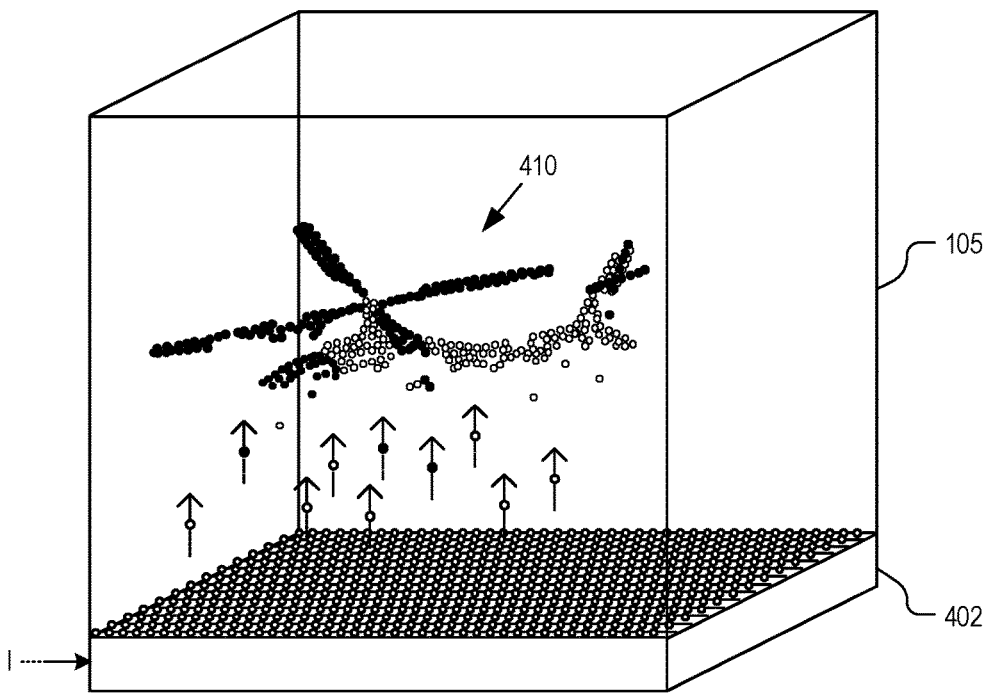
FIG. 4B illustrates a bounce pan implementation of a voxel particle injector for a volumetric display system, in accordance with an embodiment of the disclosure.

FIGS. 4A and 4B illustrate example voxel particle injectors controlled by injector driver 220 to introduce voxel particles 101 into volumetric display stage 105. FIG. 4A illustrates a drop pan injector 401 disposed above volumetric display stage 105, in accordance with an embodiment of the disclosure. In one embodiment, drop pan injector 401 drops voxel particles 101 in a controlled and sequential manner into the 3D space of volumetric display stage 105. Drop pan injector 401 may contain multi-colored voxel particles 101, as discussed above, and meter out specific colors as necessary to build up unified 3D shape 405. In one embodiment, drop pan injector 401 may contain monochromatic voxel particles 101 and drop voxel particles 101 in small or large groups. As voxel particles 101 fall, they encounter localized low potential energy zones, which trap the voxel particles and hold them in position. In one embodiment, these low potential energy zones established by the 3D sound field pattern may be added or built up in layers starting with a bottom layer, then as voxel particles 101 are added into volumetric display stage 105 from above, the 3D sound field pattern is updated to add the next layer of low potential energy zones and so on. In yet other embodiments, the 3D sound field pattern may be established from the outset and voxel particles 101 continuously dropped into volumetric display stage 105 until all or a majority of the low potential energy zones have been occupied by a corresponding voxel particle 101.

FIG. 4B illustrates a bounce pan injector 402 disposed below volumetric display stage 105, in accordance with an embodiment of the disclosure. In one embodiment, bounce pan injector 402 bounces or otherwise injects voxel particles 101 in a controlled and sequential manner up into the 3D space of volumetric display stage 105. Bounce pan injector 402 may contain multi-colored voxel particles 101, as discussed above, and meter out specific colors as necessary to build up unified 3D shape 405. In one embodiment, bounce pan injector 402 may contain monochromatic voxel particles 101 and vertically inject voxel particles 101 in small or large groups. As voxel particles 101 are driven up, they encounter localized low potential energy zones, which trap the voxel particles and hold them in position. In one embodiment, these low potential energy zones established by the 3D sound field pattern may be added or built up in layers starting with a top layer, then as voxel particles 101 are added into volumetric display stage 105, the 3D sound field pattern is updated to add the next lower layer of low potential energy zones and so on. In yet other embodiments, the 3D sound field pattern may be entirely established from the outset and voxel particles 101 continuously bounced up into volumetric display stage 105 until all or a majority of the low potential energy zones have been occupied by a corresponding voxel particle 101.

Returning to FIG. 3, once voxel particles 101 are initially positioned, process 300 commences feedback tracking in a process block 335. Feedback tracking may be performed visually by one or more image sensors 120 using image tracking techniques, performed audibly using acoustic sensors 125, or performed based upon a combination of both feedback sensing systems. The feedback sensors are disposed about volumetric display stage 105 with different vantage points to acquire position information of voxel particles 101. Image sensors 120 and/or acoustic sensors 125 can provide real-time feedback signals (Vn for image sensors 120 or Mn for acoustic sensors 125) to feedback sensing module 210. Feedback sensing module 210 analyzes the feedback signals in real-time to determine the positions, and thereby track, individual voxel particles 101 (process block 335). In a decision block 340, volumetric image module 205 determines whether the 3D sound field pattern should be re-computed/adjusted (process block 345) based upon the real-time feedback of how voxel particles 101 are reacting to the sound waves. This real-time adjustment enables volumetric display system 100 to adapt to its surroundings and account for environmental disturbances (e.g., air fluctuations, external audible noises, sound wave reflections from external objects, etc.). After computing adjustments to the 3D sound field pattern, process 300 returns to process block 325 and repeats.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A volumetric display system, comprising:
   a volumetric display stage within which a plurality of voxel particles are re-arrangeable via acoustic pressure waves to assume controllable positions in three-dimensional ("3D") space to collectively assume a unified 3D shape;
   a plurality of acoustical actuators disposed about the volumetric display stage to emit the acoustic pressure waves and establish a 3D sound field pattern within the volumetric display stage to physically manipulate the voxel particles; and
   a control system coupled to the acoustical actuators to manipulate the 3D sound field pattern, wherein the control system includes a volumetric image module configured to receive 3D image data describing the unified 3D shape and compute the 3D sound field pattern that physically arranges the voxel particles into the unified 3D shape, wherein the volumetric image module includes:
      a sonic interference analyzer coupled to receive an initial approximation of the 3D sound field pattern and to refine the initial approximation to account for acoustical interference caused by the voxel particles themselves when physically manipulated within the volumetric display stage.

2. The volumetric display system of claim 1, wherein the plurality of acoustical actuators are physically disposed about the volumetric display stage to establish the 3D sound field pattern as standing wave patterns in three dimensions within the volumetric display stage.

3. The volumetric display system of claim 2, wherein the plurality of acoustical actuators comprise eight speaker modules each disposed adjacent to a corner of a rectangular volume shape centered about the volumetric display stage.

4. The volumetric display system of claim 1, further comprising:
   feedback sensors disposed about the volumetric display stage to sense positions of the voxel particles within the volumetric display stage in real-time, wherein the feedback sensors are coupled to the control system to provide feedback signals to the control system indicative of the positions of the voxel particles within the volumetric display stage, wherein the control system further comprises a feedback sensing module coupled to receive the feedback signals from the feedback sensors and to track the voxel particles in real-time based on the feedback signals, wherein the volumetric image module is coupled to the feedback sensing module to update the 3D sound field pattern based upon real-time tracking of the voxel particles within the volumetric display stage.

5. The volumetric display system of claim 4, wherein the feedback sensors include image sensors, wherein the feedback signals include real-time images of the voxel particles, and wherein the feedback sensing module includes an image tracking module that identifies and tracks individual voxel particles based upon the real-time images.

6. The volumetric display system of claim 4, wherein the feedback sensors include acoustic sensors, wherein the feedback signals include real-time sound recordings of the 3D sound field pattern, and wherein the feedback sensing module includes a sonic tracking module that identifies and tracks individual voxel particles based upon the real-time sound recordings.

7. The volumetric display system of claim 1, wherein the volumetric image module further includes:
a sound field pattern generator coupled to receive the 3D image data and to compute the initial approximation of the 3D sound field pattern based upon the 3D image data.

8. The volumetric display system of claim 1, wherein voxel particles comprise spherical particles.

9. The volumetric display system of claim 1, wherein the voxel particles comprise three different colored voxel particles capable of representing a multi-color 3D unified shape.

10. The volumetric display system of claim 1, further comprising:
a voxel particle injector disposed adjacent to the volumetric display stage, the voxel particle injector coupled to the control system to inject the voxel particles into the volumetric display stage.

11. The volumetric display system of claim 10, wherein the voxel particle injector comprises a bounce pan disposed below the volumetric display stage to controllably bounce the voxel particles into the volumetric display stage.

12. The volumetric display system of claim 10, wherein the voxel particle injector comprises a drop pan disposed above the volumetric display stage to controllably drop the voxel particles into the volumetric display stage.

13. An apparatus, comprising:
a volumetric display stage within which a plurality of voxel particles are physically manipulated via acoustic pressure waves;
a plurality of acoustical actuators disposed about the volumetric display stage to emit the acoustic pressure waves and establish a three-dimensional ("3D") sound field pattern within the volumetric display stage to physically manipulate the voxel particles via the acoustic pressure waves; and
a control system coupled to the acoustical actuators, the control system including logic instructions that, when executed by the control system, will cause the apparatus to perform operations comprising:
receiving 3D image data describing a 3D shape;
computing the 3D sound field pattern for physically manipulating the voxel particles in 3D space to collectively assume the 3D shape; and
driving the acoustical actuators to establish the 3D sound field pattern within the volumetric display stage to causes the voxel particles to assume controllable positions in the 3D space to collectively assume the 3D shape,
wherein computing the 3D sound field pattern includes:
computing an initial approximation of the 3D sound field pattern based upon the 3D image data; and
refining the initial approximation to account for acoustical interference caused by the voxel particles when positioned within the volumetric display stage to assume the 3D shape.

14. The apparatus of claim 13, wherein computing the 3D sound field comprises computing standing wave patterns in three dimensions within the volumetric display stage.

15. The apparatus of claim 13, further comprising:
feedback sensors disposed about the volumetric display stage to sense positions of the voxel particles within the volumetric display stage in real-time, wherein the feedback sensors are coupled to the control system to generate feedback signals indicative of the positions of the voxel particles within the volumetric display stage,
wherein the control system includes further logic instructions that, when executed by the control system, will cause the apparatus to perform further operations comprising:
receiving the feedback signals from the feedback sensors;
tracking the voxel particles in real-time based upon the feedback signals; and
updating the 3D sound field pattern based upon real-time tracking of the voxel particles within the volumetric display stage.

16. The apparatus of claim 15, wherein the feedback sensors include image sensors, wherein the feedback signals include real-time images of the voxel particles, and wherein tracking the voxel particles comprises identifying and tracking individual voxel particles based upon the real-time images.

17. The apparatus of claim 15, wherein the feedback sensors include acoustic sensors, wherein the feedback signals include real-time sound recordings of the 3D sound field pattern, and wherein tracking the voxel particles comprises identifying and tracking individual voxel particles based upon the real-time sound recordings.

18. The apparatus of claim 13, wherein voxel particles comprise spherical particles.

19. The apparatus of claim 13, wherein the voxel particles comprise three different colored voxel particles capable of representing a multi-color 3D shape.

20. The apparatus of claim 13, further comprising:
a voxel particle injector disposed adjacent to the volumetric display stage,
wherein the control system includes further logic instructions that, when executed by the control system, will cause the apparatus to perform further operations comprising:
injecting the voxel particles into the volumetric display stage in a sequential and controllable manner.

21. The apparatus of claim 13, wherein the control system includes further logic instructions that, when executed by the control system, will cause the apparatus to perform further operations comprising:

receiving other 3D image data describing another 3D shape different than the 3D shape;

computing a series of 3D sound field patterns that sequentially morph the voxel particles from assuming the 3D shape into assuming the other 3D shape; and driving the acoustical actuators to establish the series of 3D sound field patterns in a sequential order that morphs the voxel particles from the 3D shape into the other 3D shape.

22. The apparatus of claim 20, wherein injecting the voxel particles into the volumetric display stage in the sequential and controllable manner comprises:

establishing a first layer of the 3D sound field pattern within the volumetric display stage;

injecting a first layer of the voxel particles into the volumetric display stage associated with the first layer of the 3D sound field pattern; and establishing subsequent layers of the 3D sound field pattern and injecting subsequent layers of the voxel particles to successively build the 3D shape in layers.

23. The apparatus of claim 13, wherein refining the initial approximation to account for acoustical interference caused by the voxel particles when positioned within the volumetric display stage to assume the 3D shape comprises:

applying a sound model describing how each of the voxel particles affect sound waves of various frequencies.

24. A volumetric display system, comprising:

a volumetric display stage within which a plurality of voxel particles are re-arrangeable via acoustic pressure waves to assume controllable positions in three-dimensional ("3D") space to collectively assume a unified 3D shape;

a plurality of acoustical actuators disposed about the volumetric display stage to emit the acoustic pressure waves and establish a 3D sound field pattern within the volumetric display stage to physically manipulate the voxel particles; and a control system coupled to the acoustical actuators to manipulate the 3D sound field pattern, wherein the control system includes a volumetric image module configured to receive 3D image data describing the unified 3D shape and compute the 3D sound field pattern that physically arranges the voxel particles into the unified 3D shape, wherein the voxel particles comprise surface structures or shapes that encourage axial rotation of the voxel particles to develop an angular inertia that increases stability of the voxel particles when assuming the unified 3D shape within the volumetric display stage.

\* \* \* \* \*